Patented Jan. 6, 1948

2,433,879

UNITED STATES PATENT OFFICE 2,433,879

MANUFACTURE OF AMINO ACID PREPARATIONS INTENDED FOR INTRAVENOUS SUPPLY OF NUTRIENTS

Karl Arvid Johannes Wretlind, Stockholm, Sweden

No Drawing. Application April 1, 1944, Serial No. 529,200. In Sweden March 29, 1943

Section 1, Public Law 690, August 8, 1946
Patent expires March 29, 1963

2 Claims. (Cl. 210—8.5)

The present invention relates to a process of purifying amino acid-polypeptide mixtures obtained by enzymatic hydrolysis of natural proteins to render such amino acid mixtures useable for the supply of nutrients to humans by intravenous injections.

The enzymatic hydrolysis of natural proteins, such as casein or blood protein, yields mixtures of amino acids and soluble peptones containing considerable proportions of polypeptidies and other water-insoluble high molecular protein decomposition products. Some of these high molecular mixture components, although harmless on oral ingestion, produce toxic effects on direct injection in the human blood stream, and must therefore be eliminated from mixtures which are to be used for the intravenous supply of nutrients to humans.

However, since the proteolysates constitute excellent nutrient media for numerous bacteria which tend to destroy the amino acids and which produce, as result of their metabolism, pyrogenic toxines difficult to eliminate even if the bacteria are subsequently killed by sterilization, it is necessary to effect purification of the amino acid-polypeptide mixtures under conditions which prevent the growth of bacteria and effect elimination of such live or dead bacteria and their metabolism products as may happen to be present in the mixtures.

Heretofore, amino acid-polypeptide mixtures obtained from the enzymatic hydrolysis of natural proteins have been purified by dialysis through semi-permeable membranes, such as Cellophane membranes, in the presence of toluol, which was added to the inner and the outer liquid, and at a low temperature of about 0° C., in order to prevent the growth of bacteria.

However, the results obtained were frequently unsatisfactory, even if the dialysis was carried out under perfectly sterile conditions and with all possible precautions. Furthermore, dialysis at low temperatures proceeds at a very slow rate which involves an added danger of bacterial contamination.

Notwithstanding these drawbacks, it appears that dialysis of amino acid-polypeptide mixtures at higher temperatures has never been attempted heretofore, probably because it has been observed that even at low temperatures, very small amounts of the undesirable higher molecular mixture components pass through the dialysing membrane and, as it was known that the permeability of Cellophane and the like membranes rises with increasing temperatures, it was feared that at high temperatures no satisfactory separation of the amino acids and peptones from the undesirable polypeptides and other high molecular protein products could be obtained. Moreover, there exists a general prejudice in the art against the treatment of amino acids at temperatures exceeding room temperature for prolonged periods because of the known tendency of some of the amino acids to decompose under discoloration even at temperatures in the neighborhood of 100° C., if subjected to such temperatures for extended periods of time.

One object of the present invention is to purify amino acids-polypeptide mixtures obtained from the enzymatic hydrolysis of natural proteins by a process which is carried out at comparatively high temperatures.

Another object of the invention is to effect such purification under conditions which prevent the growth of bacteria effectively and completely without the use of toluol or low temperatures.

A still further object of the invention is to prepare from amino acid-polypeptide mixtures obtained from the enzymatic hydrolysis of natural proteins, amino acid solutions which are suitable for intravenous injection in the process requiring a minimum of precautions.

Still another object of the invention is to purify amino acid-polypeptide mixtures by a dialysis proceeding at a much faster rate than was heretofore possible.

Surprisingly, it has been found that on dialysis of an aqueous amino acid-polypeptide mixture obtained from an enzymatic hydrolysis of natural proteins through a semi-permeable membrane against distilled water while maintaining the temperature of the liquids on both sides of the membrane between about 45° C. and 80° C., the desired amino acids diffuse into the distilled water while only an insignificant proportion of the undesirable polypeptides and other high molecular protein decomposition products will penetrate the dialysing membrane. On the other hand, at these temperatures the growth of bacteria is completely and effectively prevented and moreover, the dialysis proceeds at a much faster rate than at the low temperatures used in the prior art. At temperatures up to 80° C., no decomposition or dark coloring of the amino acids has been observed even after many hours.

In the manufacture of preparations according to the present invention a natural protein, such as casein or blood protein, is subjected to trypsin digestion in the presence of toluol until no further increase of the amino nitrogen contents can be observed. The hydrolysis may be further advanced by means of an extract of the mucous membrane of the gut containing polypeptidase. The solution is concentrated, and is subjected to dialysis against distilled water through a semi-permeable membrane at a temperature above 45° C., and but not exceeding 80° C., preferably at a temperature of about 70–80° C. The dialysis is preferably carried out in hot chambers with both liquid media being pre-heated. After a few hours' dialysis a concrete is made of the outer liquid which, after dilution to a concentration suitable for injection, sterile filtration and biological testing, can be used for intravenous supply of nutrient material to human beings.

Having now described my invention, what I claim as new and desire to secure by Letters Patent is:

1. A method of purifying amino acid-polypeptide mixtures obtained from the enzymatic hydrolysis of natural proteins in order to render the amino acid mixtures suitable for the intravenous supply of nutrients to humans, comprising the step of subjecting an aqueous solution of an amino acid-polypeptide mixture obtained from the enzymatic hydrolysis of natural proteins to a dialysis through a semi-permeable membrane against distilled water while maintaining both liquid media at a temperature between 45° C. and 80° C.

2. A process as claimed in claim 1 in which the dialysis is carried out while both liquid media are maintained at a temperature between 70° C. and 80° C.

KARL ARVID JOHANNES WRETLIND.

REFERENCES CITED

The following references are of record in the file of this patent:

UNITED STATES PATENTS

| Number | Name | Date |
|---|---|---|
| 1,885,393 | Schaack | Nov. 1, 1932 |
| 2,303,430 | Braak | Dec. 1, 1942 |
| 2,365,457 | Daniel | Dec. 19, 1944 |

OTHER REFERENCES

Neidle, Jr. Amer. Chem. Soc., vol. 38, (1916) pages 1270–1272. (Photostat in Division 49.)

Schmidt, Chemistry of the Amino Acids and Proteins, 1938, page 171. (Copy in Division 63.)